(12) United States Patent
Aten

(10) Patent No.: US 9,410,501 B2
(45) Date of Patent: Aug. 9, 2016

(54) TRANSLATING SLEEVE ACTUATION SYSTEM AND APPARATUS

(71) Applicant: ROHR, INC., Chula Vista, CA (US)

(72) Inventor: Michael Aten, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 127 days.

(21) Appl. No.: 14/262,530

(22) Filed: Apr. 25, 2014

(65) Prior Publication Data

US 2015/0308382 A1  Oct. 29, 2015

(51) Int. Cl.
  *F02K 1/76* (2006.01)
  *F02K 1/72* (2006.01)
  *F02K 1/56* (2006.01)

(52) U.S. Cl.
  CPC ............ *F02K 1/763* (2013.01); *F02K 1/566* (2013.01); *F02K 1/72* (2013.01); *Y02T 50/671* (2013.01)

(58) Field of Classification Search
  CPC ............ F02K 1/72; F02K 1/763; F02K 1/766
  See application file for complete search history.

(56) References Cited

U.S. PATENT DOCUMENTS

| 4,278,220 | A | * | 7/1981 | Johnston | F02K 1/72 244/110 B |
| 4,442,987 | A | * | 4/1984 | Legrand | B64D 29/08 239/265.25 |
| 4,519,561 | A | * | 5/1985 | Timms | F02K 1/605 239/265.33 |
| 6,592,074 | B2 | * | 7/2003 | Dehu | F02K 1/72 244/110 B |
| 2002/0125370 | A1 | | 9/2002 | Dehu et al. | |
| 2009/0188233 | A1 | * | 7/2009 | Vauchel | F02K 1/09 60/226.2 |
| 2010/0192715 | A1 | * | 8/2010 | Vauchel | F02K 1/763 74/89.35 |
| 2011/0016846 | A1 | * | 1/2011 | Maalioune | F02K 1/763 60/226.2 |
| 2014/0061332 | A1 | * | 3/2014 | Dezeustre | F02K 1/72 239/265.19 |

OTHER PUBLICATIONS

Extended European Search Report dated Sep. 16, 2015 in European Application No. 15164372.3.

* cited by examiner

*Primary Examiner* — Phutthiwat Wongwian
*Assistant Examiner* — Stefan Ibroni
(74) *Attorney, Agent, or Firm* — Snell & Wilmer, L.L.P.

(57) ABSTRACT

A translating sleeve actuation system is provided. The translating sleeve actuation system may be configured with one or more screws coupled to one or more motors configured to drive the screws. The screws may be disposed in channels defined in the track beams. The translating sleeve actuation system may also comprise one or more shuttles configured to translate forward and aft along the screw in the track beam channels.

15 Claims, 6 Drawing Sheets

TRANSLATING SLEEVE ACTUATION SYSTEM AND APPARATUS

FIELD

The present disclosure relates to translating sleeve actuation systems, and more specifically, to translating sleeve actuation systems that are installed within the support and/or guide structures of the nacelle.

BACKGROUND

Typical aircraft engines and/or nacelles generally comprise a thrust reverser system. The thrust reverser system may be configured to provide reverse thrust to slow the aircraft during a landing event (e.g., after touchdown). Thrust reverser support structures may affect the external profile and/or aerodynamic features of an aircraft, possibly reducing the overall efficiency of the aircraft in flight.

SUMMARY

In various embodiments, a thrust reverser system may comprise a first track beam, a first screw, a first shuttle, and a translating sleeve. The first track beam may define a first track beam channel. The first screw may be disposed in the first track beam channel. The first screw may be configured to rotate in the first track beam channel. The first shuttle may be installed on the first screw. The first shuttle may be disposed in and configured to translate in the first track beam channel. The translating sleeve may be coupled to the first shuttle.

In various embodiments, a nacelle may comprise a track beam, a nut, a translating sleeve, a screw and a motor. The track beam may include a track beam channel. The nut may include a shuttle channel disposed in and configured to translate forward and aft in the track beam channel. The translating sleeve may be operatively coupled to the nut. The screw may be rotatably installable in the shuttle channel. The screw may be configured to drive the nut forward and aft in the track beam channel. The motor may be configured to drive the screw.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
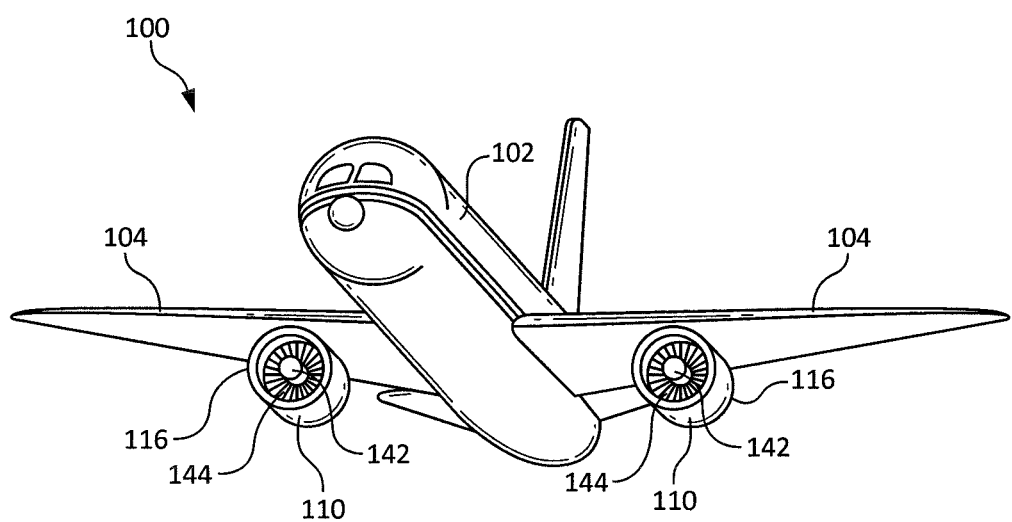
FIG. 1A illustrates a perspective view of an aircraft, in accordance with various embodiments.
Figure 1B:
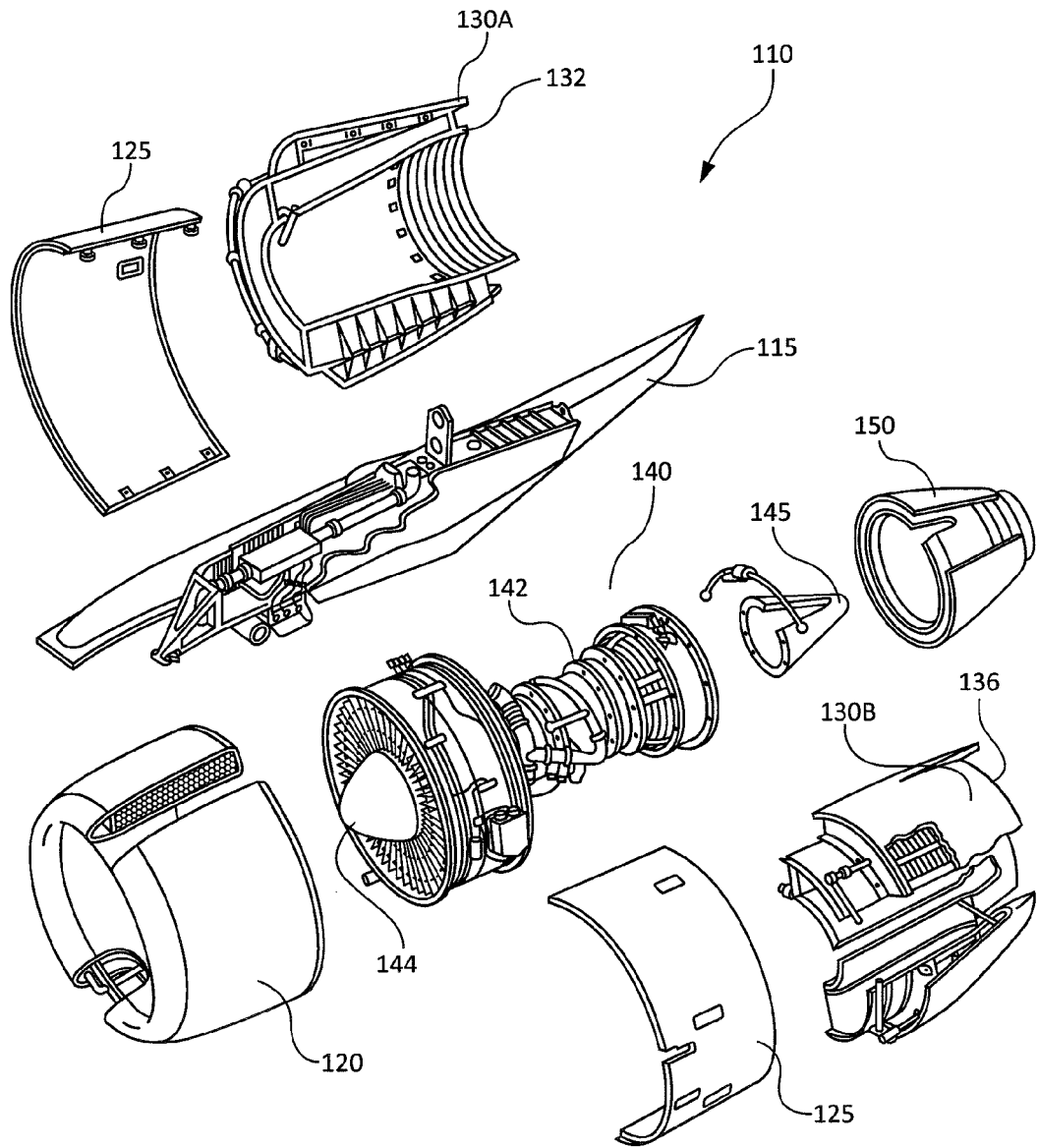
FIG. 1B illustrates an exploded perspective view of propulsion system, in accordance with various embodiments.

In various embodiments and with reference to FIGS. 1A and 1B, an aircraft 100 may comprise a fuselage 102 and a pair of wings 104. Propulsion system 110 (e.g., turbofan jet engine 140 with a nacelle assembly 116) may be mounted on the underside of wing 104. Propulsion system 110 may be configured to provide forward thrust and/or propulsion for aircraft 100.

In various embodiments, propulsion system 110 may comprise an engine 140 (e.g., a fan 142 and an engine core 144), a pylon 115, and a nacelle package 116. The typical nacelle package, or more simply a nacelle, may comprise an inlet 120, a fan cowl 125, a thrust reverser hemisphere 130A and hemisphere 130B, and an exhaust system including an exhaust cone 145, and exhaust nozzle 150. The nacelle surrounds the engine core 144 providing smooth aerodynamic surfaces for airflow around and into engine 140. The nacelle also helps define a bypass air duct through propulsion system 110.

In various embodiments, fan 142 may draw and direct a flow of air into and through propulsion system 110. After fan 142, the air is divided into two principal flow paths, one flow path through engine core 144, and another flow path through a bypass air duct. The engine core flow path is directed into engine core 144 and initially passes through a compressor that increases the air flow pressure, and then through a combustor where the air is mixed with fuel and ignited. The combustion of the fuel and air mixture causes a series of turbine blades at the rear of engine core 144 to rotate, and to drive the engine's rotor and fan. The high-pressure exhaust gases from the combustion of the fuel and air mixture are thereafter directed through exhaust nozzle 150 at the rear of engine 140 for thrust.

In various embodiments, engine 140 may be mounted to pylon 115 in two places. One of these at the aft end of the pylon 115, over the engine turbine case, and in one of two places at the forward end of pylon 115: the engine core (core mount) or the engine fan case (fan mount). Pylon 115 transmits structural loads (including thrust) between engine 140 and wing 104, as shown in FIG. 1A.

In various embodiments, thrust reverser 130 may comprise two hemispheres, thrust reverser hemisphere 130A and thrust reverser hemisphere 130B, generally configured to surround engine core 144. Thrust reverser 130 may be hinged to the pylon 115 via one or more hinges which may provide access to an interior portion of propulsion system 110 and/or engine 140. Thrust reverser hemisphere 130A and thrust reverser hemisphere 130B may be opened and/or rotated about an attachment point on pylon 115. The thrust reverser 130 may comprise an inner fixed structure ("IFS") 132. IFS 132 may generally surround the engine core 144.

In various embodiments, thrust reverser hemisphere 130A and thrust reverser hemisphere 130B may be actuated to a closed position and retained together by a latch system. In this regards, the latch system may be configured hold and/or retain thrust reverser hemisphere 130A and thrust reverser hemisphere 130B in a closed position around engine core 144.

Figure 2:
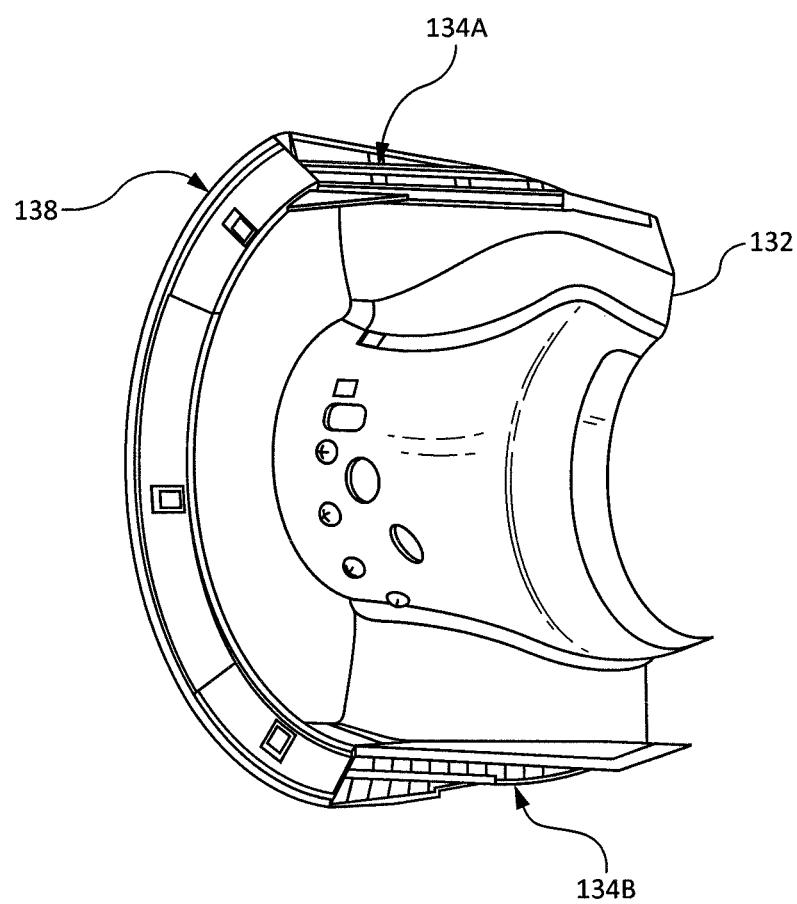
FIG. 2 illustrates a portion of a nacelle hemisphere, in accordance with various embodiments.

In various embodiments and with reference to FIG. 2, IFS 132 may comprise and/or be operatively coupled to a first track beam 134A (e.g., an upper track beam, a hinge beam, and/or the like) and a second track beam 134B (e.g., a lower track beam, a latch beam, and/or the like). IFS 132 may also comprise and/or may be operatively coupled to a torque box 138. Torque box 138 may be configured to support thrust reverser structures including actuation systems, translating sleeve, cascades, and/or the like. Moreover, torque box 138 may have a radial and/or hoop structure. Torque box 138 may be configured to connect and/or support first track beam 134A and second track beam 134B.

Figure 3A:
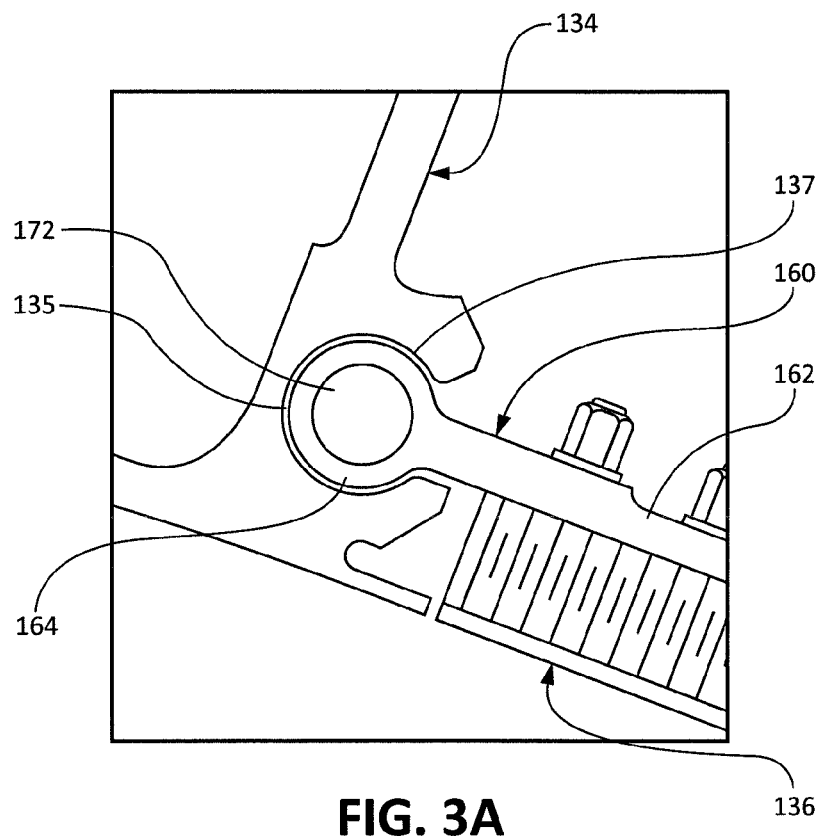
FIG. 3A illustrates a first perspective view of a portion of the translating sleeve and actuation system, in accordance with various embodiments.
Figure 3B:
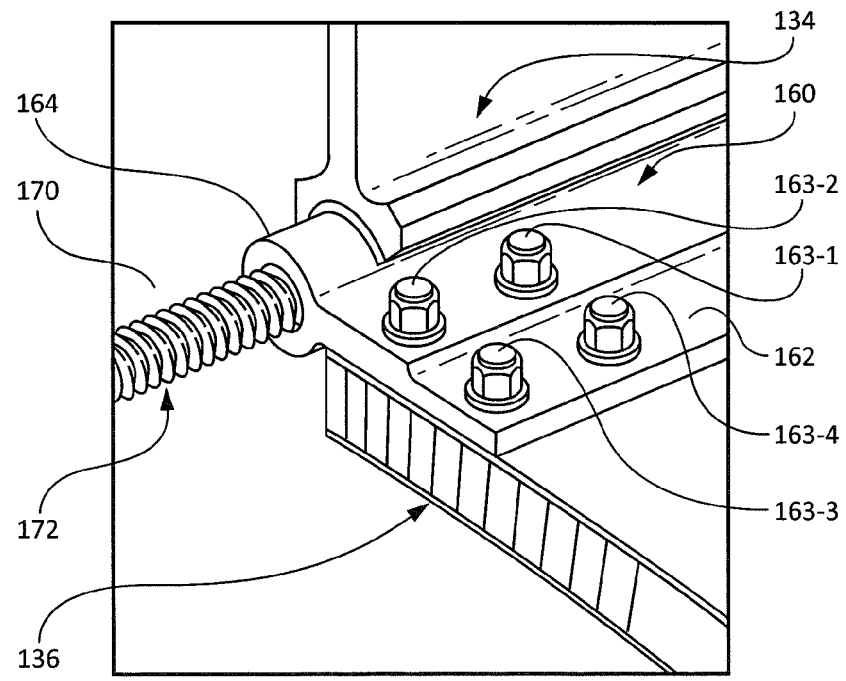
FIG. 3B illustrates a second perspective view of a portion of the translating sleeve and actuation system, in accordance with various embodiments.

In various embodiments and with reference to FIG. 3A and FIG. 3B, translating sleeve 136 may be supported by and may travel along track beam 134. Moreover, translating sleeve 136 may be operatively coupled to actuation system 170. In this regard actuation system 170 may be capable of moving translating sleeve 136 forward and aft along track beam 134. More specifically, track beam 134 may be configured to carry translating sleeve 136 and may define the path of translation of translating sleeve 136.

In various embodiments, translating sleeve 136 may comprise and/or be operatively coupled to a nut 160 (e.g., a shuttle). Nut 160 may be operatively coupled to translating sleeve 136. Nut 160 may comprise a shuttle body 162. Shuttle body 162 may be operatively coupled to translating sleeve 136 via one or more fasteners 163 (shown as fastener 163-1, fastener 163-2, fastener 163-3, and fastener 163-4, in FIG. 3B). Nut 160 and/or shuttle body 162 may further comprise a shuttle channel 164. Shuttle channel 164 may be of any suitable size and shape. Shuttle channel 164 may be integrally formed in shuttle body 162. Moreover, shuttle channel 164 may have a threaded interior portion.

In various embodiments and with reference to FIGS. 3A-3B and FIGS. 4A-4C, actuation system 170 may comprise a motor mechanism 174 and a screw 172. Motor mechanism 174 may be configured to drive screw 172 causing screw 172 to turn. Actuation system 170 may be operatively coupled to torque box 138.

In various embodiments, track beam 134 may comprise and/or define a track beam channel 137. Track beam channel 137 may be configured to receive a portion of nut 160 such as, for example, shuttle channel 164. In this regard, at least a portion of nut 160 may be disposed in track beam channel 137. Track beam channel 137 may have a partially circular and/or C-shape. Moreover, track beam channel 137 may comprise an opening and/or passage allowing a portion of shuttle channel 164 and/or shuttle body 162 to pass through and be carried by track beam channel 137, which may also allow translating sleeve 136 to translate along track beam 134.

In various embodiments, track beam channel 137 may be configured with a liner 135. Liner 135 may be configured to limit the amount of friction between track beam channel 137 and/or track beam 134 and shuttle body 162 and/or shuttle channel 164. In this regard when translating sleeve 136 is actuated aft by screw 172, liner 135 may prevent, limit, and/or minimize friction between track beam channel 137 and shuttle channel 164 as translating sleeve 136 moves aft along track beam 134. More specifically, shuttle channel 164 may move forward and aft in track beam channel 137. As such, liner 135 may reduce the relative friction between track beam channel 137 and shuttle channel 164.

Traditional translating sleeve/cascade style thrust reversers employ two or more actuators to translate the translating sleeve aft in response to the thrust reverser system being deployed. These thrust reverser actuators are typically positioned along a radius defined by the cascade and in the same plane as this cascade. In this regard, typical thrust reverser actuators may interrupt the hoop structure and/or load path of the cascades. Moreover, these thrust reverser actuators may reduce the overall flow area of the cascade and/or thrust reverser system and may require that the thrust reverser system employ structural supports such as for example an aft cascade ring to support the non-continuous cascade structure.

Figure 4A:
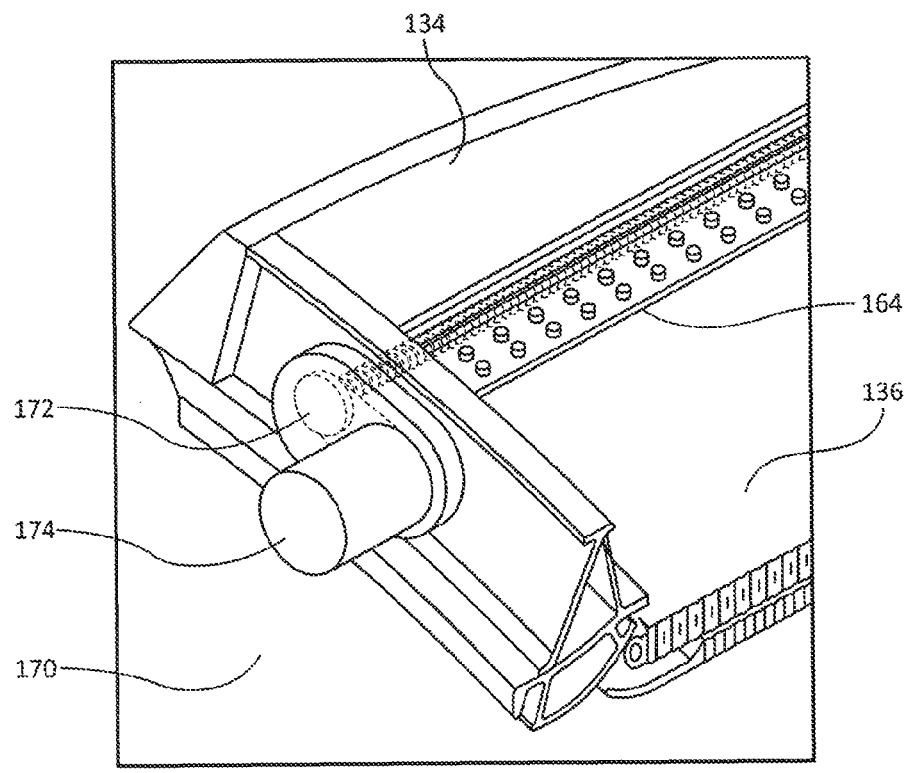
FIG. 4A illustrates a second perspective view of a portion of the translating sleeve and actuation system including a motor, in accordance with various embodiments.
Figure 4B:
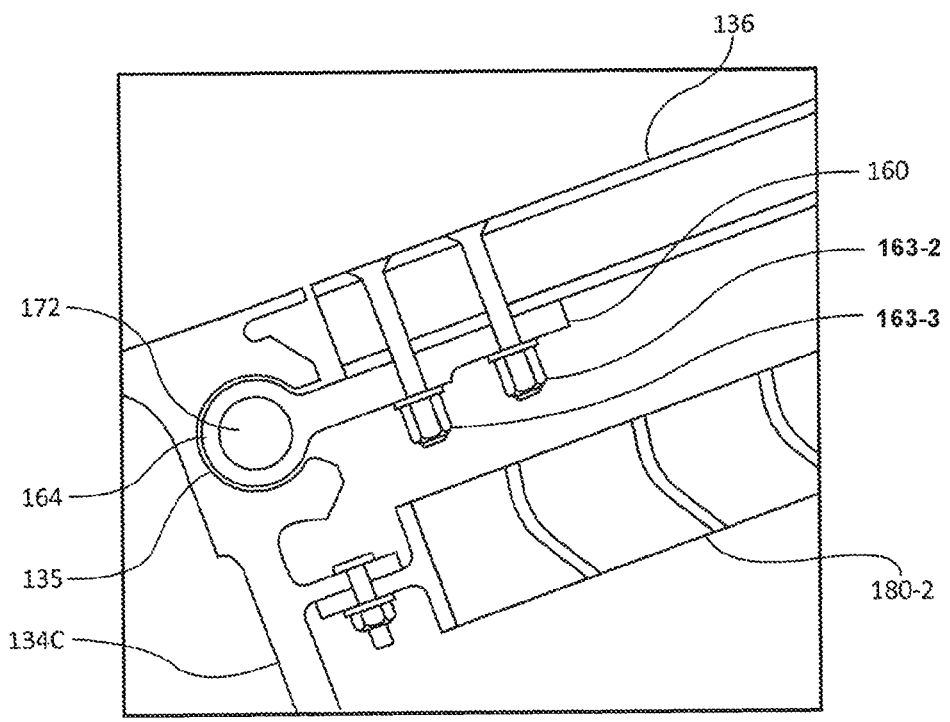
FIG. 4B illustrates a partial cross-sectional view of an upper portion of the translating sleeve, in accordance with various embodiments.
Figure 4C:
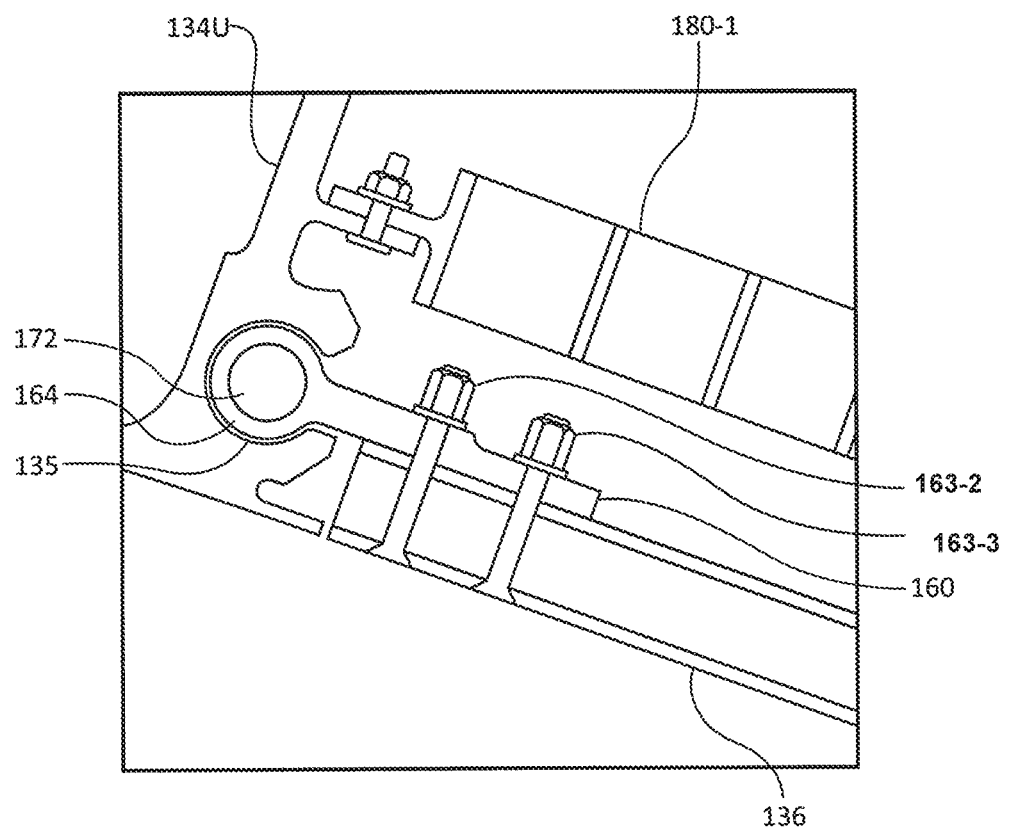
FIG. 4C illustrates a partial cross-sectional view of an lower portion of the translating sleeve, in accordance with various embodiments.

In various embodiments and with reference to FIGS. 4A-4C, by integrating the actuation system 170 into the upper track beam 134U and lower track beam 134L and/or shuttle body 162-1 and shuttle body 162-2 of the thrust reverser, a cascade array 180 may be made as a continuous structure where first cascade array portion 180-1 shown in FIG. 4B is continuous and integral with second cascade array portion 180-2 shown in FIG. 4C. In this regard, cascade array 180 may be a continuous structure (e.g., a continuous hoop structure, a homogenous structure, a single structure, and/or the like) that is coupled at a first cascade array portion 180-1 to upper track beam 134U and at a second cascade array portion 180-2 to a lower track beam 134L. Moreover, cascade array 180 may eliminate the need for an aft cascade ring typically provided in typical thrust reverser systems. Elimination of the aft cascade ring may provide aerodynamic benefits to the external surfaces of the nacelle. Elimination of the aft cascade ring may also reduce the overall weight of the nacelle structure and provide for greater performance.

In various embodiments, integration of actuation system 170 into the nut 160 of translating sleeve 136 and/or the track beam 134 carrying translating sleeve 136 may increase the overall flow area of cascade array 180. More specifically and for example, by eliminating typical translating sleeve actuators from the cascade array, cascade array 180 may be produced as a continuous structure with a greater flow area than a typical cascade array (e.g., flow area associated with the installation locations of the eliminated translating sleeve actuators may be added to the overall flow area of the cascade array).

In various embodiments, incorporating actuation system 170 into the nut 160 and/or track beam 134 for translation of translating sleeve 136 in response to thrust reverser actuation may allow for smaller overall cascade arrays 180 capable of meeting flow requirements for an engine. In this regard, the increase in flow area with the elimination of the structural actuators may allow for a smaller overall cascade array 180 (e.g., a shorter array). The smaller cascade array 180 may provide for more efficient packaging of the thrust reverser system in nacelle 116. The smaller cascade array 180 may also provide for more efficient aerodynamic features and/or loft lines of the nacelle while incorporating a thrust reverser capable of flow matching of engine 140.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A Thrust reverser system, comprising:
a first track beam defining a first track beam channel;
a thrust reverser actuator integrated into the first track beam, the thrust reverser actuator comprising:
a first screw disposed in the first track beam channel and configured to rotate;
a motor mounted on a torque box having a first wall and a second wall with a cavity defined therebetween, the motor installed directly on the first wall and wherein the torque box is located between the motor and the translating sleeve and the motor configured to drive the first screw, the first screw and the motor having different rotational axes;
a first shuttle installed on the first screw, the first shuttle disposed in and configured to translate forward and aft in the first track beam channel; and
a translating sleeve coupled to the first shuttle and configured to translate along the first track beam.

2. The thrust reverser system of claim 1, wherein the first shuttle includes a shuttle channel that is configured to receive the first screw.

3. The thrust reverser system of claim 1, wherein the first shuttle is coupled to the translating sleeve with fasteners.

4. The thrust reverser system of claim 1, wherein the first track beam is a hinge beam.

5. The thrust reverser system of claim 1, further comprising a second shuttle coupled to the translating sleeve.

6. The thrust reverser system of claim 5, further comprising a second track beam, the second track beam comprising a second track beam channel, wherein the second shuttle is disposed in and configured to translate forward and aft in the second track beam channel.

7. The thrust reverser system of claim 6, wherein the second track beam is a latch beam.

8. A nacelle, comprising:
a track beam including a track beam channel;
a nut including a shuttle channel disposed in and configured to translate forward and aft in the track beam channel;
a translating sleeve operatively coupled to the nut and configured to translate along the track beam;
a screw rotatably installable in the shuttle channel and configured to drive the nut forward and aft in the track beam channel; and
a motor mounted on a torque box having a first wall and a second wall with a cavity defined therebetween, the motor installed directly on the first wall and wherein the torque box is located between the motor and the translating sleeve and the motor configured to drive the screw, the screw and the motor having different rotational axes.

9. The nacelle of claim 8, further comprising a cascade having a continuous hoop structure.

10. The nacelle of claim 9, wherein the continuous hoop structure defines a hoop load path.

11. The nacelle of claim 9, further comprising a latch beam, wherein the track beam is a hinge beam.

12. The nacelle of claim 11, wherein the cascade is supported by the latch beam and the hinge beam.

13. A thrust reverser system, comprising:
a first track beam defining a first track beam channel;
a first screw disposed in the first track beam channel and configured to rotate;
a motor mounted on a torque box having a first wall and a second wall with a cavity defined therebetween, the motor installed directly on the first wall and wherein the torque box is located between the motor and the translating sleeve and the motor configured to drive the first screw, the first screw and the motor having different rotational axes;
a first shuttle installed on the first screw, the first shuttle disposed in and configured to translate forward and aft in the first track beam channel; and
a translating sleeve fastened directly to the first shuttle.

14. The thrust reverser system of claim 13, wherein the first shuttle includes a shuttle channel that is configured to receive the first screw.

15. The thrust reverser system of claim 13, further comprising a second shuttle coupled to the translating sleeve and a second track beam, the second track beam comprising a second track beam channel, wherein the second shuttle is disposed in and configured to translate forward and aft in the second track beam channel.

\* \* \* \* \*